H. HAMMOND.
Assignor, by direct and mesne assignments, to J. H. WILLIAMS & Co.
WRENCH.
No. 11,277. Reissued Oct. 18, 1892.
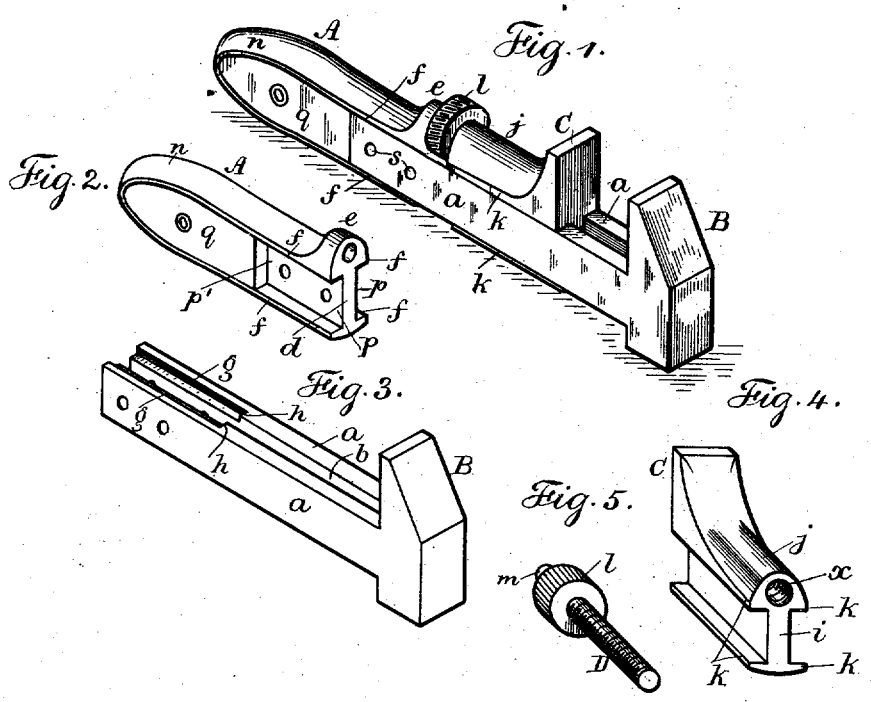
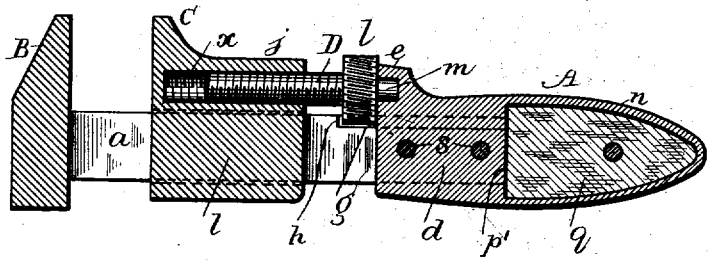
Witnesses:
J. Stail
Chas. H. Smith
Inventor:
Henry Hammond
per Lemuel W. Serrell
Atty.
THE NORRIS PETERS CO., PHOTO-LITHO., WASHINGTON, D. C.

UNITED STATES PATENT OFFICE.

HENRY HAMMOND, OF ASHBOURNE, PENNSYLVANIA, ASSIGNOR, BY DIRECT AND MESNE ASSIGNMENTS, TO J. H. WILLIAMS & CO., OF BROOKLYN, NEW YORK.

WRENCH.

SPECIFICATION forming part of Reissued Letters Patent No. 11,277, dated October 18, 1892.

Original No. 410,240, dated September 3, 1889. Application for reissue filed July 18, 1892. Serial No. 440,419.

*To all whom it may concern:*

Be it known that I, HENRY HAMMOND, a citizen of the United States, formerly of New Haven, in the county of New Haven and State of Connecticut, but now residing at Ashbourne, in the State of Pennsylvania, have invented new and useful Improvements in Wrenches, of which the following is a specification.

The object of the present invention in wrenches is to so improve the construction thereof as to insure the greatest durability and strength in the wrench with little liability of its becoming injured or inoperative in use, and to enable an easy formation of the various parts and their attachment or detachment to or from each other; and the invention consists in the construction and combination of the various parts for operation, all substantially as will hereinafter more fully appear, and be set forth in the claims.

In the drawings, Figure 1 is a perspective view of the wrench. Figs. 2 and 3 are perspective views of the handle and fixed jaw portions of the wrench, respectively, detached from each other. Fig. 4 is a perspective view of the part constituting the sliding jaw detached, the same being shown, however, with its rear end forward or opposite to that seen in Fig. 1. Fig. 5 is a perspective view of the jaw-operating screw detached. Fig. 6 is a central longitudinal section of the wrench.

This wrench essentially consists of four parts, as above mentioned—namely, the stock or handle A, the stationary jaw B, fixed to and supported from said handle, the sliding jaw C, movable on the extension-bars *a* of the fixed jaw, and the screw D, having an enlarged knurled periphery *l*, confined against endwise movement with relation to the handle, but capable of rotation and having a screw engagement with said sliding jaw. The stock or handle portion A at its rear end is of a form to be conveniently grasped by the hand, and back from its forward end for a suitable distance on each side thereof said stock is rabbeted, as at *p*, an intermediate web *d* being integrally formed with the metal from which the handle is made. Toward the forward end of the said handle is a perpendicularly-extending lug *e*, having a socket therein. The stationary and outer jaw, having the rearwardly-projecting parallel bars *a*, with the separating-space *b* between them, which extends from the outer open ends of the bars up to the plane of the inner face of the said jaw B, is by the outer end portion of said bars disposed and seated within the rabbets *p* of the handle and secured thereto by screws *s*, or otherwise, passing laterally through said bars and the web *d*, which they embrace, the overlying flanges *f* at the borders of the said rabbets lying over and upon the edges of the said bars, thereby making the connection and support of the said jaw-carrying bars with and by the handle a most rigid one. At the edges of the said bars from which the jaws project they are chamfered or grooved for a certain distance, beginning at their ends, as seen at *g* in Figs. 3 and 6, the abutment-shoulders *h* being formed at the ends of such grooves. The sliding jaw C, having the shank *j* formed integrally therewith and having therein the axial screw-threaded socket *x*, in cross-section is of H shape, formed by the intermediate web *i* and the lateral flanges *k*, and the screw D having been engaged with the screw-threaded socket *x* in the shank of the sliding jaw, said jaw is—before the stationary jaw-bars and handle have been connected, as described—placed within and upon the bars of the stationary jaw, the intermediate web *i* fitting between the inner walls of the bars and the overhanging flanges *k* resting on the edges of said bars *a*, as shown. With the handle and the bars *a* connected, the knurled thumb-rim *l* and the screw D as well are held against endwise movement by the said rim being confined between the end wall of the lug *e* and the shoulders *h* at the inner ends of the grooves in the bars *a*. At the rear of the knurled thumb-rim is an axial stud *m*, fitting in the socket of the lug *e*, forming a support for the rear end of the screw, holding the same always in its proper relation to the axial line of the screw-threaded socket *x* in the sliding jaw.

The operation of the wrench will be obvious without description on an inspection of Fig. 6. The intermediate web *d* of the handle extends, as heretofore stated, from its forward end to an intermediate part, as $p'$, of the said handle, where it terminates, the overlying flanges $f$ continuing, as at $n$, and forming an open frame suitable to be conveniently grasped. Within the said open-work frame part the space may be occupied by cheek-pieces $q$, of wood or other light material, while, on the other hand, the said space may be unoccupied, as would be in many instances preferable, affording ready means by which to hang up the wrench.

As will be apparent from the foregoing, the parts of the wrench in themselves are of the utmost simplicity in form, capable of being easily forged or otherwise formed, and when in position, in addition to the immovable and advantageous features of construction and connection between the jaw-bars and the handle already mentioned, the engagement of the sliding jaw with said bars is also peculiarly adapted for the requirements thereof, for the face of said jaw will always be held parallel with the face of the fixed jaw under any strain that may be applied thereto in using the wrench, and no straining action will be in any way imparted to the operating-screw.

What I claim as my invention is—

1. The handle A, having the side rabbets $p$ and the socketed lug $e$, combined with the jaw B, having the parallel bars $a$, provided in their edges with the grooves terminating in the shoulders $h$, as described, said bars fitting and secured by their outer end portions in said handle-rabbets, the sliding jaw having a longitudinal screw-socketed shank $x$, said shank being of H shape in cross-section and engaging and movable on said parallel jaw-bars, and an operating-screw engaging said sliding-jaw screw-socket, provided with the enlarged thumb-rim $l$, confined against end-wise movement between said handle-lug and bar-shoulders and provided with the axial stud-bearing in the said handle-lug socket, substantially as described.

2. The combination, with a fixed jaw and two bars therewith connected, of a sliding jaw between the two bars, and a screw to actuate said sliding jaw, and a handle recessed at its sides for the ends of the two bars and to which said bars are connected, substantially as specified.

Signed by me this 8th day of July, 1892.

HENRY HAMMOND.

Witnesses:

GEO. D. FIELD,

C. MATHER.